(No Model.)
E. A. MUNSON.
BOLT OR ROD CUTTER.
No. 446,360. Patented Feb. 10, 1891.
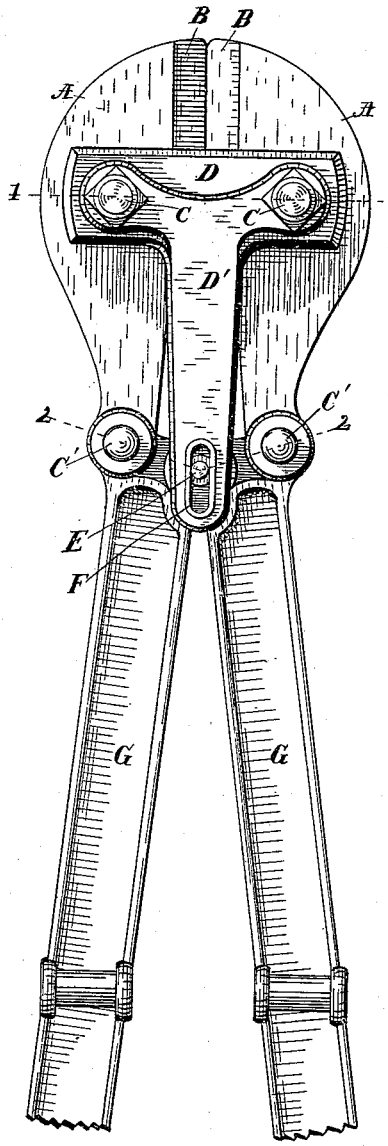
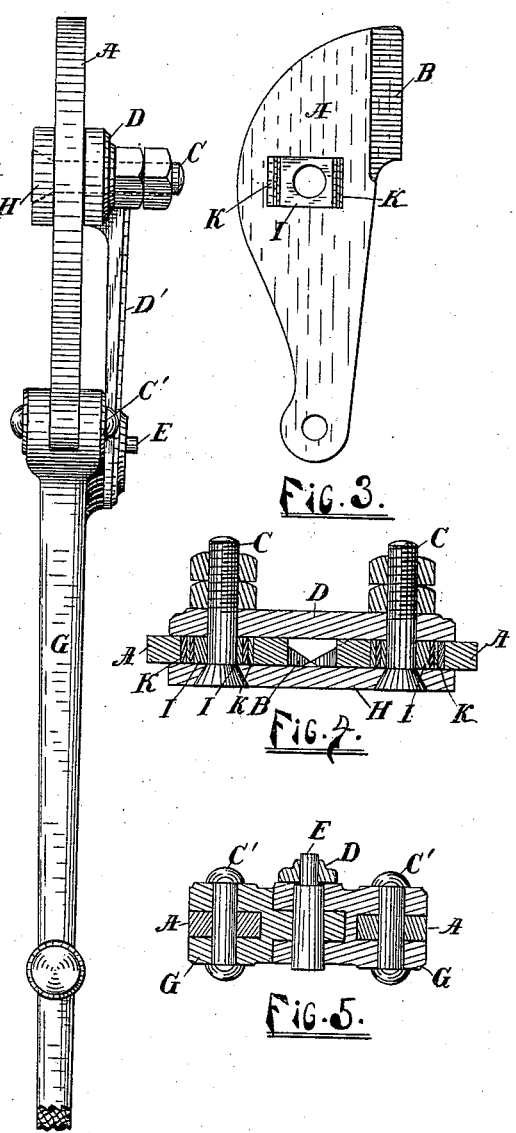
Witnesses
Hugh E. Wilson
Harry P. Van Wagner
Inventor
Edward A. Munson
By his Attorney
Edward Taggart

UNITED STATES PATENT OFFICE.

EDWARD A. MUNSON, OF GRAND RAPIDS, MICHIGAN.

BOLT OR ROD CUTTER.

SPECIFICATION forming part of Letters Patent No. 446,360, dated February 10, 1891.

Application filed December 21, 1888. Serial No. 294,315. (No model.)

*To all whom it may concern:*

Be it known that I, EDWARD A. MUNSON, a citizen of the United States, residing at the city of Grand Rapids, in the county of Kent and State of Michigan, have invented a certain new and useful Bolt or Rivet Cutter, of which the following is a specification.

My invention relates to a tool for cutting bolts, rivets, wire, and similar articles; and the objects of my invention are, first, to so pivot the cutting-jaws that the wear on them can be taken up by changing the position of the fulcrum of the jaws, and, second, to secure the jaws in such a manner as to prevent any vibratory or twisting motion and to cause both jaws to move evenly together in clipping a bolt or other article. These objects I accomplish by means of the mechanism shown in the accompanying drawings, in which—

Figure 1 represents a plan view of a bolt-cutter constructed in accordance with my invention; Fig. 2, a side view of the same; Fig. 3, a plan view of one of the jaws of the bolt-cutter detached from the other parts; Fig. 4, a horizontal sectional view on line 1 1 of Fig. 1, and Fig. 5 also a sectional view on line 2 2 of Fig. 1.

Similar letters refer to similar parts throughout the several views.

In the drawings, A A represent the cutting-jaws having the cutting-edges B B. These jaws are supported between two plates. One, which I call the "lower" one, is shown by H, and the other, a T-shaped plate, is shown by D and D'. The pivots C C pass through the plates and the jaws A A, one through each jaw, as shown. Each of the pivots C may be provided at one end with a head and terminate with a screw-thread at the other, to which thread end I prefer to apply two nuts, as shown in Fig. 4. The hole through the cutting-jaw is elongated, as shown in Fig. 3. Within this elongated opening I place the journal-bearing I, which bearing fits closely the narrowest way of the opening, but has less length than the length of the opening. The shims K K, which are preferably of metal, fit into the opening on either side of the journal-bearing I, so as to hold the bearing in the required position within the opening. This method of adjustment can be applied to one or both of the jaws; but I prefer to apply it to both jaws.

The pivots C C, passing through the jaws A A, form the fulcra on which the jaws turn and the journal-bearing I the bearing for each of these pivots. The cutting-faces B B of the jaws become worn by use, and are from time to time ground off, requiring the cutting-edges of the jaws to be brought nearer to each other. This is done by moving the jaws toward each other, by moving the bearings toward the outer sides of the elongated holes, and by adjusting them to the required position in the manner described. This brings the cutting-edges of the jaws toward each other.

By constructing the bearing I with the pivot-hole nearer to one side than the other, as shown in Fig. 3, the fulcra of the jaws may be varied with reference to the jaws by merely reversing the position of the bearings. This adjustment can be used either with or without the shims.

The jaws A A are pivoted to levers or handles G G by the pivots C' C', and the handles G G are pivoted together by the pivot or bolt E, which bolt E projects through the slot F in part D' of the plate D D' and serves as a guide to such plate. In opening and closing the cutting-jaws it is obvious that the plate D D' will have a small longitudinal motion, which is provided for by the slot F. The extension D', held in position by means of the pin or pivot E, causes both of the cutting-jaws to open and close together evenly. The jaws are made of steel and the remainder of the bolt-cutter of any suitable material. The plates D D' and H hold the journal-bearing I and the shims K K in place within the cutting-jaw. A spring or other suitable device may be used to prevent the handles G G from coming in too close contact.

The bolt-cutter may be made of various sizes, so as to adapt it to cutting all kinds of rods, bolts, pins, and wire.

I am aware that bolt-cutters of the general form shown by me are not new—such being shown, for example, in Letters Patent of the United States, No. 361,554, of 1887, and in this patent the jaws are also made adjustable by means of a sleeve in the form of an eccentric, and which fits a round hole in the jaw and serves as a bearing for the jaw. It is held by a set-screw in the jaw-bearing on the periphery of the eccentric. I am also aware of the patent of Parish, of April 27, 1869, in which the pivots of the shears are located in slots in the blade-shanks and adjusted by plugs bearing against the pivots, and I do not therefore claim, broadly, either the combination of the form of cutters shown with adjustable pivot-bearings or plugs bearing against the pivots of cutters for adjustment in slotted shanks of cutters. The point of difference on which my invention is based lies in the block which forms the journal-bearing combined with the laterally-slotted shanks of the cutters, the shims, and the plates which support the cutters. These block-bearings, located snugly in the slots, afford as strong a support as if the pivots were placed directly in holes in the cutters, as would not be the case if the adjusting-plates bore directly against the bolts. Further, there is no possibility of turning these angular bearings, and no set-screws are required to hold them, which are in the way and liable to be knocked off, and which weaken jaws at the point requiring most strength. I also by this device and the eccentric location of the hole in the angular bearing get a larger amount of adjustment. I get all the adjustment of the eccentric with that of the shims in the same length of stroke. Besides this, I avoid the use of a special tool for turning the eccentrics.

I claim—

1. The combination, with the plates H D of a bolt-cutter, of a cutting-jaw provided with a transverse slot, an adjustable angular journal-bearing or block located in said slot, and the pivot C, passing through an opening in the block, substantially as described.

2. In combination with the plates H D of a bolt-cutter, a cutting-jaw provided with a transverse slot, an angular journal-bearing or block located in said slot, the pivot C, passing through the opening in the block, and shims for adjusting the position of the block, substantially as described.

In witness whereof I have hereunto set my hand and seal in the presence of two witnesses.

EDWARD A. MUNSON. [L. S.]

Witnesses:
ARTHUR C. DENISON,
HARRY P. VAN WAGONER.